A. B. UTLEY.
VALVE.
APPLICATION FILED DEC. 5, 1911.

1,035,663.

Patented Aug. 13, 1912.

WITNESSES
Samuel E. Wade

INVENTOR
ARTHUR B. UTLEY,
BY Munn & Co.
ATTORNEYS

UNITED STATES PATENT OFFICE.

ARTHUR B. UTLEY, OF SPRINGFIELD, MISSOURI.

VALVE.

1,035,663.　　　　　Specification of Letters Patent.　　Patented Aug. 13, 1912.

Application filed December 5, 1911. Serial No. 664,016.

*To all whom it may concern:*

Be it known that I, ARTHUR B. UTLEY, a citizen of the United States, and a resident of Springfield, in the county of Greene, State of Missouri, have invented a new and useful Improvement in Valves, of which the following is a specification.

My invention is an improvement in valves, and has for its object the provision of a simple valve for use with flushing tanks for controlling the flow of water to the tank, wherein means is provided for quickly closing the valve at the proper time, regardless of the water pressure.

Figure 1:
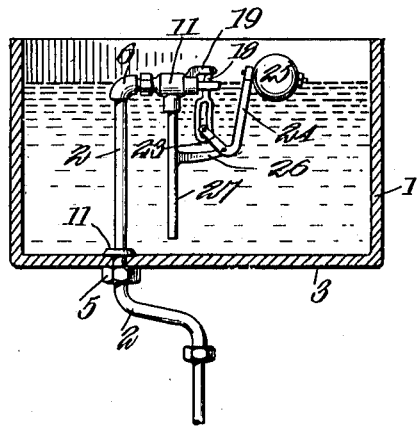
Figure 2:
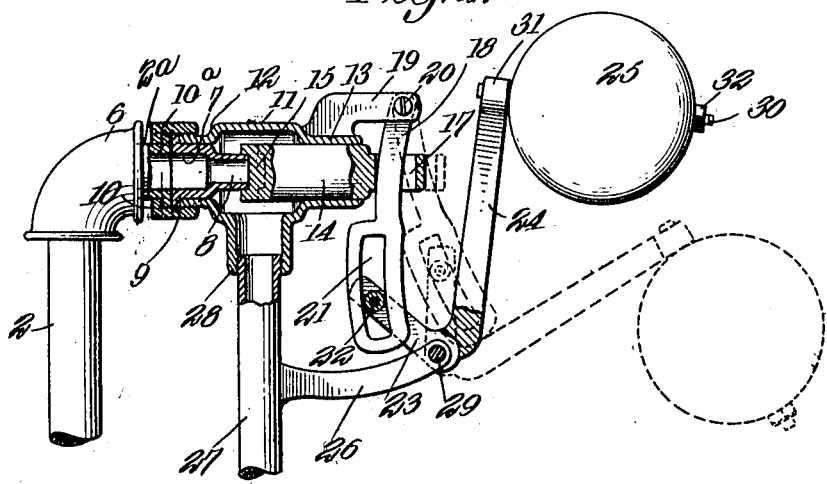

In the drawings: Figure 1 is a transverse vertical section of a tank provided with the improvement; and Fig. 2 is an enlarged side view with parts in section.

In the present embodiment of the invention the tank 1 is of usual construction, and the pipe 2 passes into the tank through the bottom 3 thereof, and the joint between pipe and tank is packed water-tight by a washer 4 encircling the pipe on the upper face of the bottom, and a nut 5 encircling the pipe below the said bottom.

The pipe 2 extends upwardly in the tank to the required water level, and one end of an elbow 6 is threaded onto the pipe.

A pipe 2ª is threaded into the other end of the elbow, and the said pipe is provided at its outer end with an annular rib 2ᵇ. A reducing sleeve 7—8 is abutted against the end of the pipe 2ª, the said sleeve having an annular shoulder or rib 9 abutting against the rib 2ᵇ of the pipe 2ª. A casing 11 has its ends 12 and 13 reduced, and the end 12 fits over the large end 7 of the sleeve, and against the shoulder 9, and a union nut is threaded on to the end 12. The said union nut is provided with an internal annular shoulder 10ª at the end adjacent to the elbow for engaging the rib 2ᵇ. When the union nut is threaded on to the end 12, the end of the pipe 2ª will be compressed against the end of the reducing sleeve.

The reducing sleeve is the valve seat, and the small end 8 thereof extends into the body of a T or casing 11 to approximately the longitudinal center thereof. A valve 14, in the form of a plug, is slidable in the end 13 of the T, and the inner end of the plug is recessed at 15 to receive the end of the said small end to close the same.

The stem 16 of the valve extends outside of the T and is provided with a vertical opening 17. A lever 18 has one end pivoted to a bracket arm 19 on the T by means of a screw 20, and the lever passes through the opening, fitting the same loosely, as shown. The lower end of the lever 18 is widened and is slotted longitudinally, as shown at 21, and the slot is engaged by a roller 22 on one arm 23 of an elbow lever 23—24, whose other arm 24 has connected therewith a ball float 25. The elbow lever is pivoted to a bracket arm 26 extending laterally from a pipe 27, which is threaded into the lateral nipple 28 of the T.

The arms 23 and 24 of the elbow lever are arranged at an acute angle with respect to each other, and a bolt 29 pivotally connects the elbow lever to the bracket arm, passing through the arm 23 of the elbow lever near its junction with the other arm. The float is secured to the free end of arm 24 of the elbow lever by means of a bolt 30 passed through a bearing 31 on the arm, and through the float, the bolt being engaged by a nut 32 to hold the parts in place.

That portion of lever 18 between the slot and the screw 20 is arc-shaped, and the slot 21 is also arc-shaped. The pipe 27 extends to near the bottom of the tank, the lower end being spaced above the bottom sufficiently to not interfere with the flow of the water.

In operation, when the tank is opened to flush the closet the float 2 moves downward as the water leaves the tank into the dotted line position of Fig. 2. As the arm 24 is swung outward and downward, the lower end of lever 18 is swung outward until it engages the outer end of slot 17. A considerable movement of the float takes place before valve 14 is affected. As soon, however, as lever 18 is moved to engage the outer end of slot 17 the valve begins to open, to permit the water to flow from pipe 2 through the T and pipe 27 into the tank. As the tank fills, the movement of the float is reversed, until the water reaches the required level, when the valve is completely closed to shut off the water. It will be noticed from an inspection of Fig. 2 that when the float is moving from the dotted line to the full line position the pressure against lever 18 is directly inward, the roller rolling down the inner side of the slot 21. The leverage is very great, and the valve closes very readily on this account, although the pressure to be overcome, that from the main, is also great. The inner end of the valve 14 may be of compressible and elastic material, as, for instance, leather or rubber, to make a close fit.

The nut 10 is provided with an external annular polygonal rib 33 for engagement by a wrench, and may be turned toward the elbow to release the sleeve 7—8 and the end 12 of the T, when it is, for any reason, desirable to obtain access to the parts.

I claim:

1. In combination with the tank and the supply pipe leading upwardly through the bottom thereof and opening laterally at its top and having an annular external rib at its outer end, a reducing sleeve having its large end abutting against the end of the pipe, said sleeve having an external annular rib at the said end, a T having its ends reduced, one of the opposite ends fitting over the large end of the reducing sleeve and abutting against the rib, and a union nut having an internal annular rib engaging the rib of the pipe and threaded at its opposite end on to the adjacent end of the T, the small end of the reducing sleeve extending into the body of the T, a valve plug slidable in the other reduced end of the T and adapted to engage the small end of the reducing sleeve to close the same, the lateral opening of the T being downward, a discharge pipe connected therewith and opening near the bottom of the tank, means for operating the valve, said means comprising a lever pivoted at its upper end, the plug having a vertical opening for receiving the lever loosely, said lever having a longitudinal slot in its lower end, an elbow lever pivoted below the valve, a roller on one of the arms of the elbow lever and moving in the slot, and a float connected with the other arm.

2. In combination with the tank and the supply pipe leading upwardly through the bottom thereof and opening laterally at its top, a reducing sleeve having its large end engaging the lateral opening, a valve movable toward and from the small end of the reducing sleeve, said valve having a vertical opening, a lever pivoted at its upper end and extending through the opening, said lever having a slot at its lower end, an elbow lever pivoted below the first named lever, a roller on one arm of the elbow lever engaging the slot, and a float on the other arm.

ARTHUR B. UTLEY.

Witnesses:
E. M. HOUSTON,
R. I. CLOUD.